United States Patent
Claussen et al.

(10) Patent No.: US 7,004,203 B2
(45) Date of Patent: Feb. 28, 2006

(54) INSULATED HEATING AND/OR SANITATION PIPE

(75) Inventors: Joerg Claussen, Muenster (DE); Hans-Joachim Dusoer, Ochtrup (DE); Joerg Hansen, Wettringen (DE); Jyri Jaervenkyla, Hollola (FI); Franz-Josef Riesselmann, Lohne (DE)

(73) Assignee: Uponor Innovation AB, (SE)

( * ) Notice: Subject to any disclaimer, the term of this patent is extended or adjusted under 35 U.S.C. 154(b) by 0 days.

(21) Appl. No.: 10/482,660

(22) PCT Filed: Jul. 7, 2002

(86) PCT No.: PCT/EP02/07553

§ 371 (c)(1),
(2), (4) Date: Jun. 3, 2004

(87) PCT Pub. No.: WO03/006872

PCT Pub. Date: Jan. 23, 2003

(65) Prior Publication Data

US 2004/0206413 A1    Oct. 21, 2004

(30) Foreign Application Priority Data

Jul. 7, 2002   (DE) ................... 101 33 113

(51) Int. Cl.
*F16L 9/14* (2006.01)
(52) U.S. Cl. .............. 138/149; 138/121; 138/138
(58) Field of Classification Search ......... 138/149, 138/121, 122, 138
See application file for complete search history.

(56) References Cited

U.S. PATENT DOCUMENTS

| | | | | | |
|---|---|---|---|---|---|
| 2,330,966 | A | * | 10/1943 | Mcleish et al. | 138/149 |
| 3,473,575 | A | * | 10/1969 | Vogelsang et al. | 138/149 |
| 3,540,448 | A | * | 11/1970 | Voorhees | 138/121 |
| 3,698,440 | A | * | 10/1972 | Matthieu et al. | 138/149 |
| 3,717,718 | A | * | 2/1973 | Schmidtchen | 174/106 D |
| 3,812,886 | A | * | 5/1974 | Hallwood | 138/149 |
| 3,814,659 | A | * | 6/1974 | Nadeau | 428/215 |
| 3,867,244 | A | * | 2/1975 | Adams | 428/182 |
| 3,952,777 | A | * | 4/1976 | Uhlig | 138/149 |
| 4,303,105 | A | * | 12/1981 | Rohner | 138/149 |
| 4,445,543 | A | * | 5/1984 | Mead | 138/122 |
| 4,688,603 | A | * | 8/1987 | Donnerhack et al. | 138/103 |

* cited by examiner

*Primary Examiner*—James Hook
(74) *Attorney, Agent, or Firm*—Diller, Ramik & Wight

(57) ABSTRACT

The heating and/or sanitation pipe comprises an inner pipe (12) made of a plastic material and a metal corrugated pipe (14) surrounding the inner pipe (12) at a radial distance (Ⓡ). Further, the heating and/or sanitation pipe is provided with a compressible and/or expanded material (16) between the inner pipe (12) and the corrugated pipe (14) for fixing the inner pipe (12) inside the corrugated pipe (14). The compressible and/or expanded material (16) is adapted to be detached from the inner pipe for the purpose of exposing a connecting end of the inner pipe (12). Further, the heating and/or sanitation pipe comprises an insulation layer (18) surrounding the metal corrugated pipe (14) and an outer covering (20) around the insulation layer (18).

14 Claims, 1 Drawing Sheet

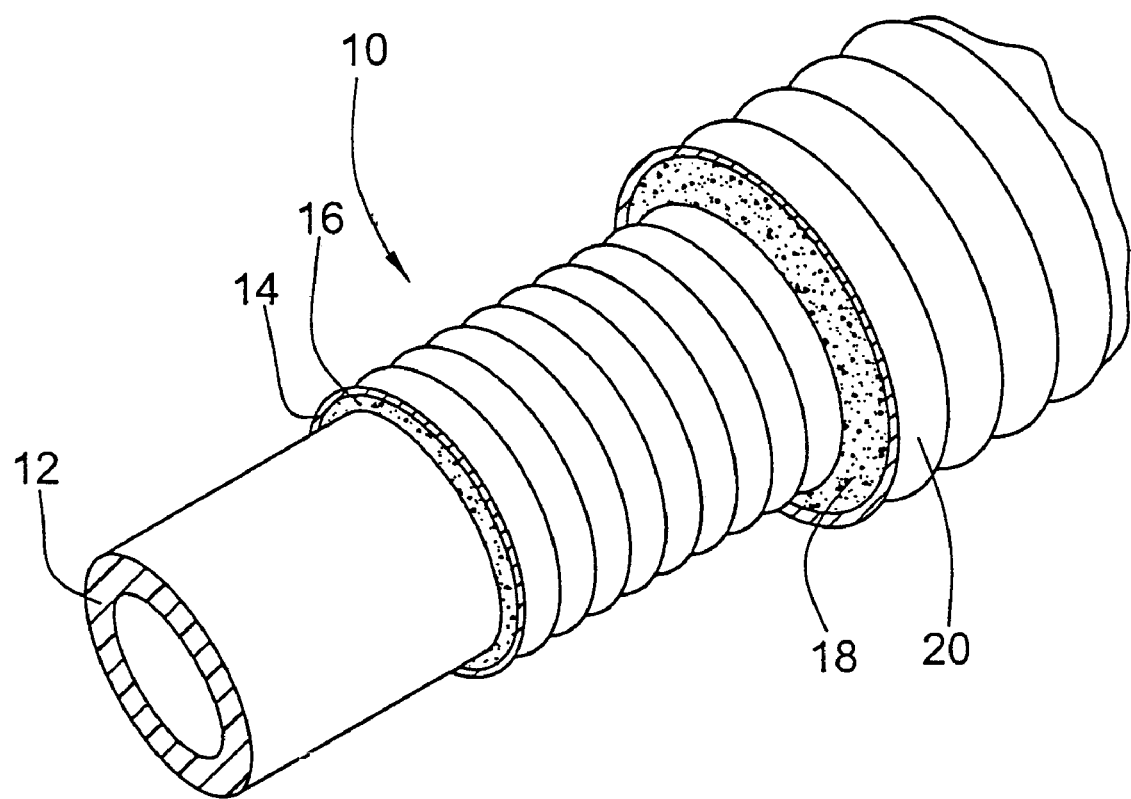

INSULATED HEATING AND/OR SANITATION PIPE

BACKGROUND OF THE INVENTION

The invention relates to a heat-insulated fluid-carrying, and in particular water-carrying pipe which is in particular used in the heating and/or sanitation sector.

Heating pipes require a diffusion barrier which prevents oxygen from penetrating the pipe wall from outside. When the fluid-carrying pipe is made of plastic material, it is provided with a diffusion barrier layer e.g. of EVOH. Alternatively, the plastic pipe can also be covered with a metal layer made in particular of aluminium. Both manufacturing processes necessitate special production steps which may be rather complex.

Such a pipe is surrounded by a heat insulation material, e.g. a PE or PUR foam, for insulation purposes, wherein said insulation layer is surrounded by an outer plastic covering which in most cases is configured as a corrugated pipe.

SUMMARY OF THE INVENTION

It is an object of the invention to provide an insulated heating and/or sanitation pipe comprising an inner pipe construction for the manufacture of which standard pipe components can be used.

According to the invention, an insulated heating and/or sanitation pipe is proposed which comprises:
  an inner pipe of plastic material,
  a metal corrugated pipe surrounding the inner pipe at a radial distance,
  a compressible and/or expanded material between the inner pipe and the corrugated pipe for fixing the inner pipe inside the corrugated pipe,
  wherein the compressible and/or expanded material is adapted to be detached from the inner pipe for the purpose of exposing the connecting end of said inner pipe,
  an insulating layer surrounding the metal corrugated pipe, and
  an outer covering around the insulating layer.

According to the invention, the heating and/or sanitation pipe comprises an inner pipe of plastic material which may be e.g. oxygen- or, more generally spoken, gas-permeable, but this is not absolutely necessary. At a radial distance to the inner pipe the latter is surrounded by a metal corrugated pipe. For fixing the inner pipe inside the metal corrugated pipe the gap between the two pipes is filled with a compressible and/or expanded material. This material is adapted to be detached from the plastic material of the inner pipe for the purpose of exposing the connecting end of said inner pipe, the detaching process being carried out in a simple manner and in particular manually such that the compressible and/or expanded material at the connecting end of the inner pipe can be removed e.g. by producing a radial circumferential cut. Thus, a commercial fitting, e.g. a press fitting, can be connected to the exposed connecting end of the inner pipe.

Around the inner pipe construction described above of the inventive insulated pipe a layer of heat insulating material (PE or PUR foam) is arranged which is surrounded by an outer covering in the form of e.g. a plastic corrugated pipe.

The invention offers the advantage that owing to provision of the metal corrugated pipe the inner pipe construction is oxygen- and water vapor-tight such that no moisture can enter the insulation layer. Due to the flexibility of the overall pipe offered by the metal corrugated pipe, the pipe is easy to lay as well as to coil and uncoil.

The inventive pipe construction counteracts any longitudinal expansion of the inner pipe since the latter is supported by the outer pipe via the material arranged between the inner pipe and the outer pipe. Thus, the longitudinal expansion of the overall pipe is determined by the longitudinal expansion of the metal outer pipe.

Further, the inventive pipe simplifies pipe installation since the metal outer (corrugated) pipe allows for plastic deformation of the overall pipe.

The compressible and/or expanded elastic flexible material is in particular a foam material. Generally, the expanded material is, in its non-expanded condition, deposited e.g. by extrusion on the plastic inner pipe, and is then expanded e.g. by heat after arrangement of the metal corrugated pipe around the inner pipe.

The permeation-tightness of the inventive heating and/or sanitation pipe is achieved by provision of the metal corrugated pipe, and it is of no importance whether the plastic inner pipe is gas-impermeable. The manufacture of the metal corrugated pipe is a usual and established process. The metal corrugated pipe can be longitudinally or helically welded, or the corrugated pipe structure is realized by forming a (smooth) metal pipe which is subsequently deformed into a corrugated pipe. As a medium-carrying inner pipe a pipe of a plastic material which is normally used for pipe applications, e.g. PP or PE, can be used within the framework of the invention.

BRIEF DESCRIPTION OF THE DRAWING

Hereunder the invention is described in detail with reference to the drawing which shows a perspective sectional view of an inventive heating and/or sanitation pipe.

DETAILED DESCRIPTION OF THE PREFERRED EMBODIMENTS

The heating and/or sanitation pipe 10 comprises an inner pipe 12 made of plastic material, in particular a cross-linked plastic material, said inner pipe 12 being surrounded at a radial distance r by a corrugated pipe 14 made of metal, in particular aluminium. For fixing the inner pipe 12 inside the corrugated pipe 14, a compressible and/or expanded foam material 16 is used which fills the gap defined by the radial distance r. The foam material 16 is adapted to be detached in a simple and in particular residue-free manner from the inner pipe for the purpose of exposing an inner pipe 12 connecting end designed to be connected e.g. to a fitting. The foam material 16 fixes the inner pipe 12 inside the corrugated pipe 14. The corrugated pipe 14 serves as a water vapor- and/or oxygen barrier (the latter in particular when the plastic inner pipe 12 does not comprise any oxygen diffusions barrier e.g. of EVOH) and imparts the necessary permeation-tightness to the overall pipe 10.

The inner pipe construction described above is surrounded by a heat insulation layer 18 around which a plastic outer covering 20 configured as a corrugated pipe is arranged. The vapor barrier formed by the metallic material of the corrugated pipe 14 prevents moisture from entering the heat insulation layer 18 via the inner pipe 12, whereby the pipe 10 retains its insulation properties over its entire service life.

Although a preferred embodiment of the invention has been specifically illustrated and described herein, it is to be understood that minor variations may be made in the apparatus without departing from the spirit and scope of the invention, as defined by the appended claims.

What is claimed is:

1. A heating and/or sanitation pipe comprising:
   an inner pipe (12) of plastic material having an exterior substantially right-cylindrical surface,
   a corrugated metal pipe (14) having an internal corrugated surface surrounding the substantially right-cylindrical exterior surface of the inner pipe (12) at a radial distance (r) defining a space between said surfaces,
   a compressible material (16) between said surfaces substantially entirely filling said space and fixing the inner pipe (12) inside the corrugated pipe (14),
   the compressible material (16) being detachable from the right-cylindrical exterior surface of the inner pipe (12) for exposing a connecting end of said inner pipe (12),
   an insulating layer (18) surrounding the metal corrugated pipe (14), and
   an outer covering (20) surrounding the insulating layer (18).

2. The heating and/or sanitation pipe according to claim 1 wherein the compressible material (16) is one of a foam material and a soft elastomeric material.

3. The heating and/or sanitation pipe according to claim 2 wherein the outer covering (20) is made of a plastic material.

4. The heating and/or sanitation pipe according to claim 2 wherein the outer covering (20) is a corrugated pipe.

5. The heating and/or sanitation pipe according to claim 1 wherein the outer covering (20) is made of a plastic material.

6. The heating and/or sanitation pipe according to claim 1 wherein the outer covering (20) is a corrugated pipe.

7. A heating and/or sanitation pipe comprising:
   an inner pipe (12) of plastic gas-impermeable material having an exterior substantially right-cylindrical surface,
   a corrugated metal pipe (14) having an internal corrugated surface surrounding the substantially right-cylindrical exterior surface of the inner pipe (12) at a radial distance (r) defining a space between said surfaces,
   an expanded material (16) between said surfaces substantially entirely filling said space and fixing the inner pipe (12) inside the corrugated pipe (14),
   the expanded material (16) being detachable from the right-cylindrical exterior surface of the inner pipe (12) for exposing a connecting end the inner pipe (12),
   an insulating layer (18) surrounding the metal corrugated pipe (14), and
   an outer covering (20) surrounding the insulating layer (18).

8. The heating and/or sanitation pipe according to claim 7 wherein the expanded material (16) is a foam material.

9. The heating and/or sanitation pipe according to claim 8 wherein the outer covering (20) is made of a plastic material.

10. The heating and/or sanitation pipe according to claim 8 wherein the outer covering (20) is a corrugated pipe.

11. The heating and/or sanitation pipe according claim 7 wherein the expanded material (16) is a soft elastomeric material.

12. The heating and/or sanitation pipe according to claim 11 wherein the outer covering (20) is a corrugated pipe.

13. The heating and/or sanitation pipe according to claim 7 wherein the outer covering (20) is made of a plastic material.

14. The heating and/or sanitation pipe according to claim 7 wherein the outer covering (20) is a corrugated pipe.

* * * * *

UNITED STATES PATENT AND TRADEMARK OFFICE
CERTIFICATE OF CORRECTION

| | |
|---|---|
| PATENT NO. | : 7,004,203 B2 |
| APPLICATION NO. | : 10/482660 |
| DATED | : February 28, 2006 |
| INVENTOR(S) | : Claussen et al. |

It is certified that error appears in the above-identified patent and that said Letters Patent is hereby corrected as shown below:

On the title page: (item 30)
    The "Foreign Application Priority Data" should correctly read as follows:
    -- Jul. 7, 2001        (DE) ........................... 101 33 113 --

Signed and Sealed this

Fifth Day of December, 2006

JON W. DUDAS
*Director of the United States Patent and Trademark Office*